US009500098B2

(12) United States Patent
Dorshimer et al.

(10) Patent No.: US 9,500,098 B2
(45) Date of Patent: Nov. 22, 2016

(54) REAR MOUNTED WASH MANIFOLD AND PROCESS

(71) Applicant: EcoServices, LLC, Farmington, CT (US)

(72) Inventors: Kurt Dorshimer, Fayetteville, GA (US); William J. Welch, Madison, CT (US); Robert M. Rice, Huntsville, AL (US); Sebastian Nordlund, Sundbyberg (SE); Wayne Zadrick, Bristol, CT (US)

(73) Assignee: EcoServices, LLC, Farmington, CT (US)

( * ) Notice: Subject to any disclaimer, the term of this patent is extended or adjusted under 35 U.S.C. 154(b) by 727 days.

(21) Appl. No.: 13/799,545

(22) Filed: Mar. 13, 2013

(65) Prior Publication Data

US 2014/0260307 A1 Sep. 18, 2014

(51) Int. Cl.

*F02C 1/00* (2006.01)
*F01D 25/00* (2006.01)

(52) U.S. Cl.

CPC ......... *F01D 25/002* (2013.01); *F05D 2250/71* (2013.01); *F05D 2260/30* (2013.01)

(58) Field of Classification Search

CPC ......... F02C 7/1435; F02C 7/00; F16L 33/00; F16L 37/00; F02B 77/04; F01D 25/002
See application file for complete search history.

(56) References Cited

U.S. PATENT DOCUMENTS 4,365,383 A 12/1982 Bartlett
5,011,540 A * 4/1991 McDermott .......... F01D 25/002 134/22.18
5,868,860 A 2/1999 Asplund
5,899,217 A 5/1999 Testman, Jr.
6,553,768 B1 * 4/2003 Trewin .................. B05B 7/0441 134/198
D548,899 S 8/2007 Asplund
7,297,260 B2 11/2007 Hjerpe et al.
7,497,220 B2 3/2009 Asplund et al.
2004/0103920 A1 6/2004 Gatzke
2005/0008474 A1 * 1/2005 Stalder .................. B05B 1/3013 415/116
2006/0219269 A1 10/2006 Rice et al.
2008/0149141 A1 6/2008 Sales
2008/0178909 A1 * 7/2008 Alvestig ................... B08B 3/02 134/18
2008/0216873 A1 9/2008 Hjerpe et al.
2008/0272040 A1 11/2008 Nordlund et al.
2009/0260660 A1 10/2009 Asplund et al.
2010/0000572 A1 * 1/2010 Giljohann ................. B08B 3/02 134/7
2010/0031977 A1 2/2010 Sales (Continued)

OTHER PUBLICATIONS

International Search Report and Written Opinion from PCT Application Serial No. PCT/US2014/024573, Dated Dec. 31, 2014, 11 pages.

*Primary Examiner* — Gerald L Sung
(74) *Attorney, Agent, or Firm* — Kinney & Lange, P.A.

(57) ABSTRACT

An engine wash manifold delivers wash liquid to an engine that includes an inlet, a fan, a case with an exhaust duct and a core inlet splitter. The manifold includes a wash delivery segment comprising a pipe shaped to follow at least in part engine case curvature with a first end to interface with the core inlet splitter and a second end with an inlet to receive wash fluid. The manifold further includes a retention system to secure the wash delivery segment to the engine and one or more nozzles on the first end of the wash delivery segment to spray wash fluid. The wash fluid may be atomized. The manifold further may include nozzles that deliver atomized wash liquid to the aft side of fan blades and may be used in conjunction with an inlet mounted manifold.

29 Claims, 11 Drawing Sheets

(56) References Cited

U.S. PATENT DOCUMENTS

| | | | |
|---|---|---|---|
| 2010/0243001 | A1 | 9/2010 | Amcoff et al. |
| 2011/0186096 | A1 | 8/2011 | Nordlund et al. |
| 2011/0232697 | A1 | 9/2011 | Amcoff et al. |
| 2011/0247501 | A1 | 10/2011 | Nordlund et al. |
| 2013/0104934 | A1* | 5/2013 | Tadayon ............... F01D 25/002 134/10 |

* cited by examiner

REAR MOUNTED WASH MANIFOLD AND PROCESS

BACKGROUND

Through use, gas turbine engines become subject to buildup of contaminants on engine components. These contaminants can affect engine components and overall performance of the engine. In order to improve efficiency, engine compressors and turbine sections are routinely cleaned.

Conventional engine washing can be done using an inlet mounted manifold for spraying wash fluid into the engine. The engine can be cranked, allowing the fluid to flow through the core engine flowpath, removing contaminants.

SUMMARY

An engine wash manifold for delivery of wash liquid to an engine that includes an inlet, a fan, a case with an exhaust duct and a core inlet splitter. The manifold includes a wash delivery segment comprising a pipe shaped to follow at least in part engine case curvature with a first end to interface with the core inlet splitter and a second end with an inlet to receive wash fluid. The manifold further includes a retention system to secure the wash delivery segment to the engine and one or more nozzles on the first end of the wash delivery segment to spray wash fluid.

A method for washing an engine with an inlet, a fan, a core inlet, a core inlet splitter and an exhaust duct includes securing the manifold in the engine aft of the fan; and spraying wash fluid from the manifold.

DETAILED DESCRIPTION

Figure 1A:
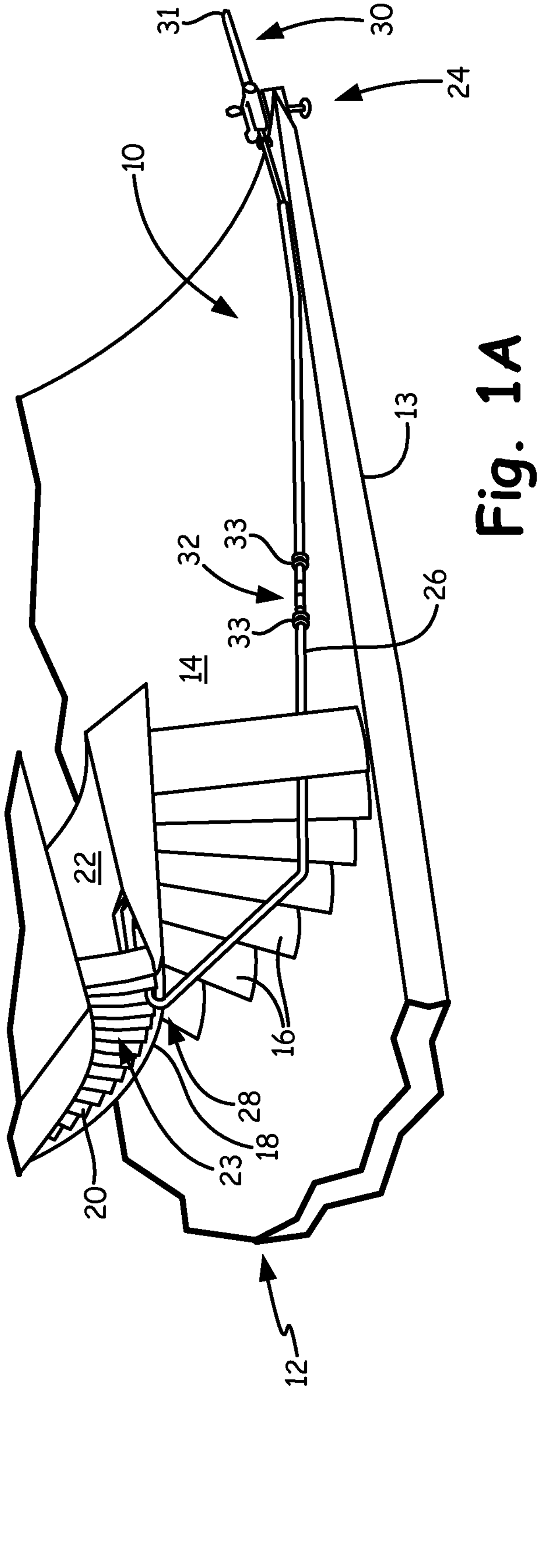
FIG. 1A shows a perspective view of a rear mounted engine wash manifold connected to an engine with part of the engine cut-away for viewing purposes.
Figure 1B:
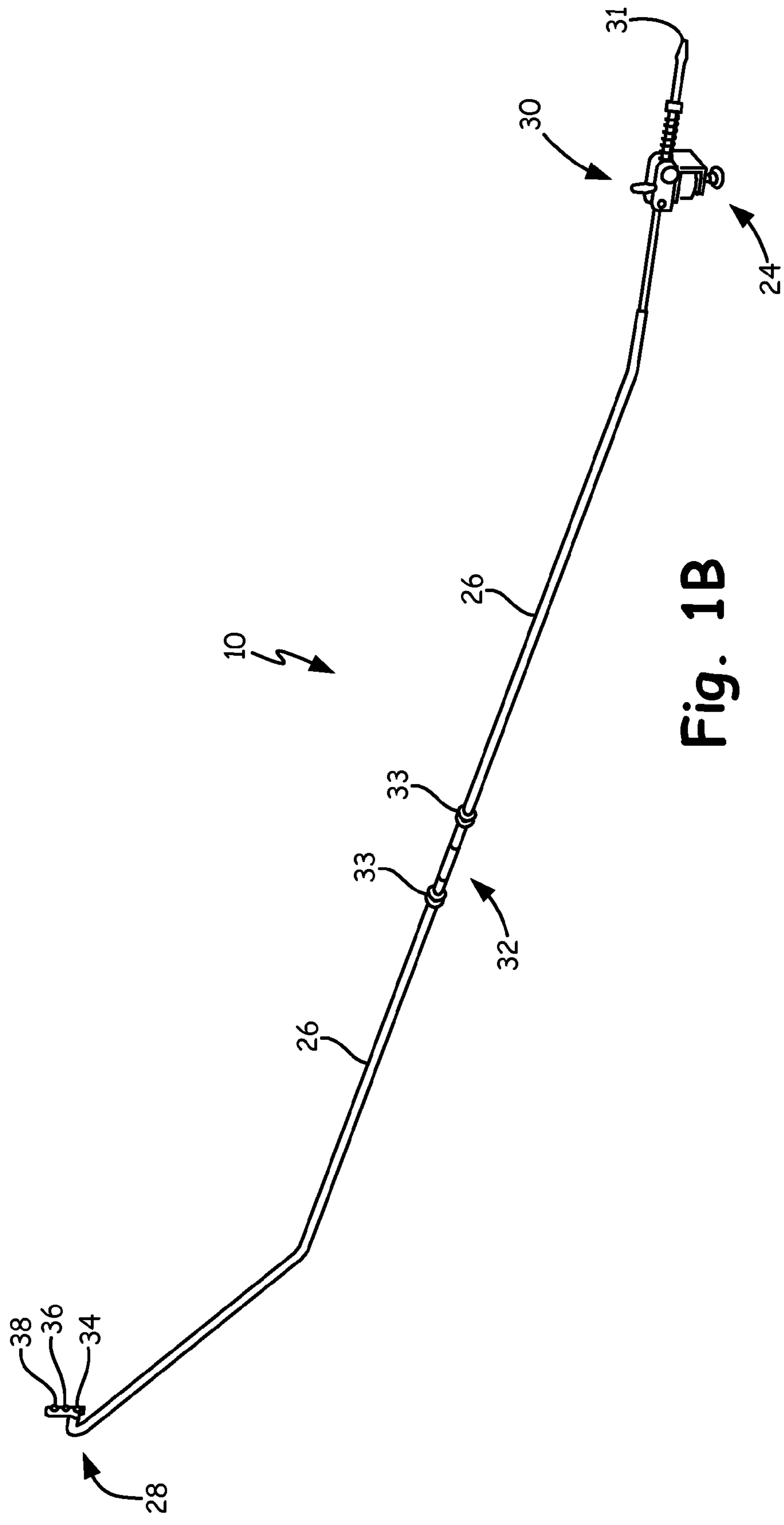
FIG. 1B shows a perspective view of the engine wash manifold of FIG. 1A.
Figure 1C:
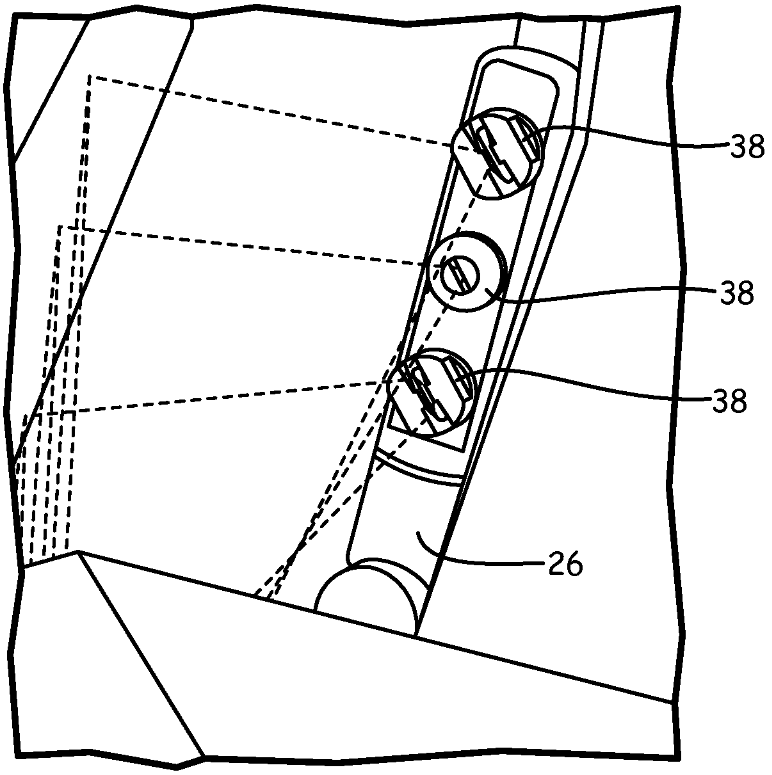
FIG. 1C shows a close-up view of a portion of the engine wash manifold of FIG. 1A.

FIG. 1A shows a perspective view of a rear mounted engine wash manifold 10 connected to an engine 12 with part of the engine cut-away for viewing purposes. FIG. 1B shows a perspective view of engine wash manifold 10, and FIG. 1C shows a close-up view of a portion of the engine wash manifold 10. Portion of engine 12 shown includes case 13, bypass duct 14 with fan exit guide vanes 16, core inlet splitter 18, stators 20 and engine core 22 with core inlet 23. Manifold 10 includes retention system 24, wash delivery segment 26 with first end 28, second end 30 with inlet 31, connection 32 (with rings 33) and nozzles 34, 36, 38.

Wash delivery segment 26 of manifold is designed and shaped to at least partially follow curvature of the engine, specifically the inside curvature of case 13 which forms bypass duct 14. Second end 30 of manifold 10 includes inlet 31 to receive wash fluid. First end 28 of manifold is shaped to interface with core inlet splitter 18 and additionally includes nozzles 34, 36, 38. Nozzles 34, 36, 38 can atomize the wash fluid, and can be specifically angled, shaped and/or designed to bypass stators 20 and penetrate core 22 with spray consisting of desired properties based on engine, environment and other factors. Wash fluid may be deionized, heated, atomized, sized, directed and/or pressurized to be delivered at a specific flow rate and velocity to ensure effective cleaning and engine core penetration. Wash delivery segment 26 is a typically a pipe, covered with a coating to ensure it does not scratch and/or damage engine 12 components. Wash delivery segment 26 pipe can be made of stainless steel or other materials depending on system requirements. This coating can be a rubber coating, a plastic coating or other types of coating depending on system requirements. Second end 30 of manifold 10 also includes retention feature 24 (which will be discussed in detail in FIGS. 4A-4B) and inlet 31. Inlet 31 can be a quick coupling fitting for connection to a high forward hose from a wash unit (not shown).

In the embodiment shown, manifold 10 is formed of two portions, with connection 32 connecting the portions. This can be a quick-fit connection and can allow for easy disassembly, transporting of manifold 10 and/or storage. Connection 32 includes rubber rings or other protective material to ensure connection 32 components do no scratch and/or damage engine 10, as connection 32 components are typically metal.

Manifold 10 connects to engine 12 by entering bypass duct 14. First end 28 interfaces with core inlet splitter 18, positioning nozzles 34, 36, 38 to spray into engine core 22. As can be seen in FIG. 1C, nozzles 34, 36 and 38 are each angled and shaped differently to provide different cleaning capabilities to engine core. For example, nozzles 34, 36, 38 may be pointed toward different parts of engine core, dispense fluid at different rates and/or temperature, and/or may be completely different nozzle types. Retention system 24 connects to case 13 around bypass duct 14, securing manifold 10 with respect to engine 12.

Manifold 10 allows for rear mounted washing of engine 13 core 22 by shaping manifold 10 to interface with core inlet splitter 18 and bypass duct 14. This provides wash fluid directly to engine core inlet 23 by accessing core inlet 23 through bypass duct 13. Retention system 24 and the interface of manifold 10 first end 28 with core inlet splitter 18 ensure manifold 10 is secure during washing so that nozzles 34, 36, 38 can deliver fluid into core 22 as intended. Providing atomized wash fluid directly to core inlet 23 can ensure greater droplet penetration through compressor and turbine of engine 12 compared to conventional methods. Improved penetration of engine 12 core 22 can increase removal of contaminants, thus increasing engine 12 performance by decreasing engine temperatures, reducing fuel consumption, restoring engine power and improving overall engine 12 efficiency.

Figure 2A:
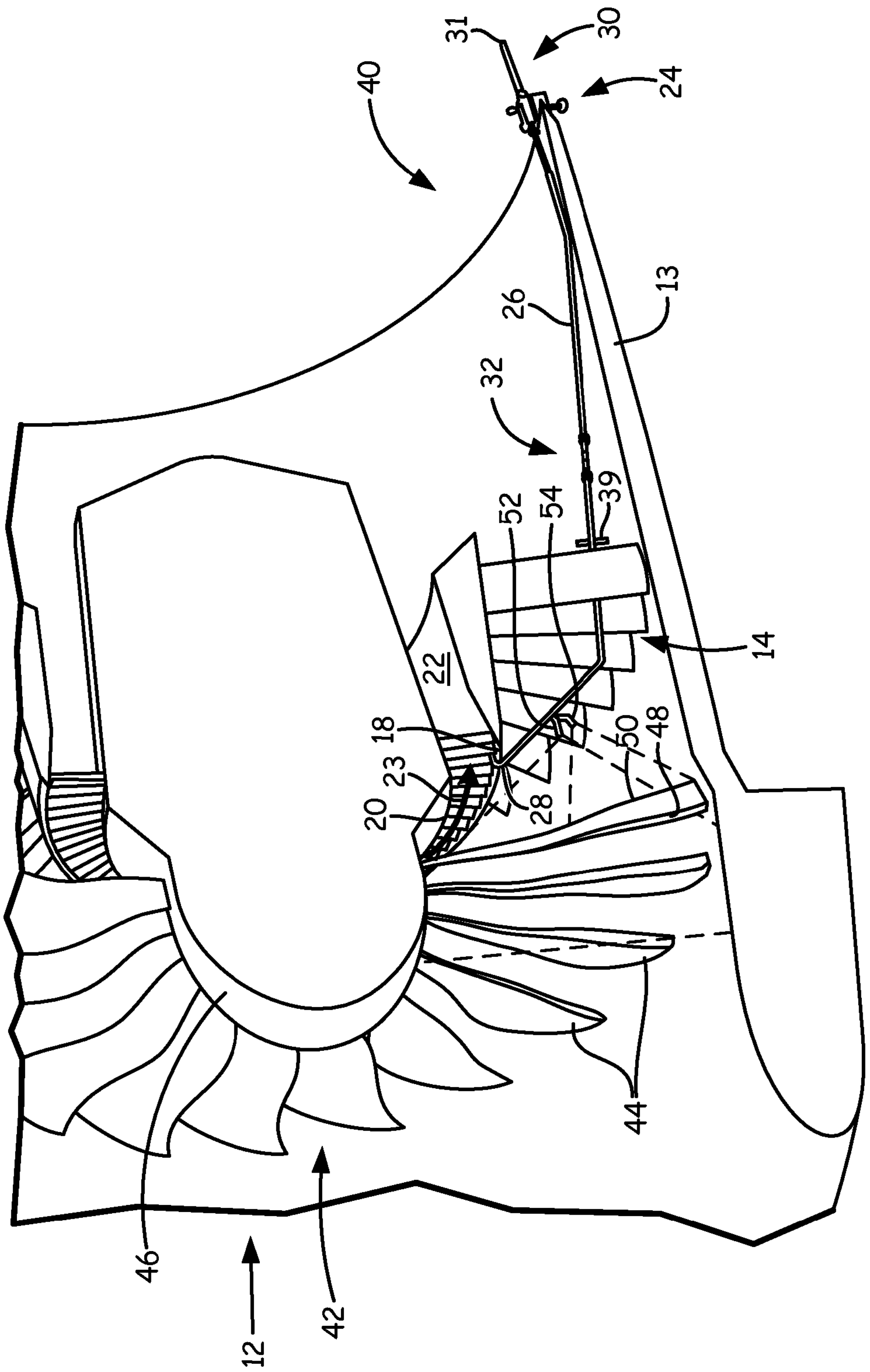
FIG. 2A shows a second embodiment of a rear mounted engine wash manifold connected to an engine with part of the engine cut-away for viewing purposes.
Figure 2B:
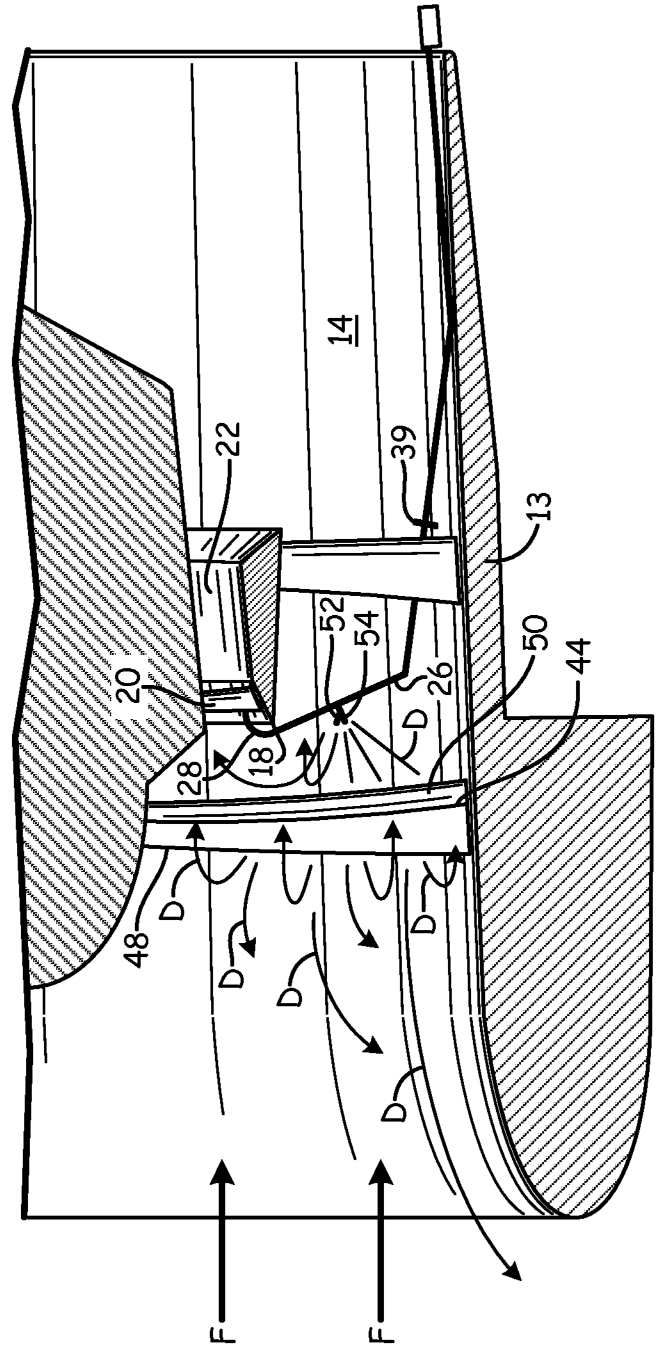
FIG. 2B shows a close up view of a portion of the manifold and engine of FIG. 2A.
Figure 2C:
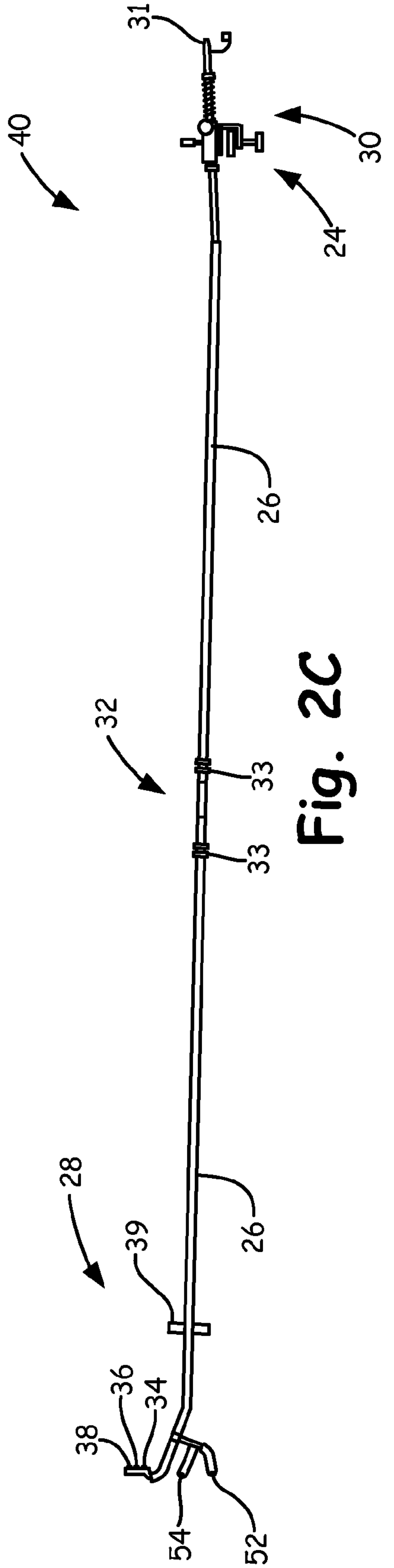
FIG. 2C shows a perspective view of the manifold of FIG. 2A.
Figure 2D:
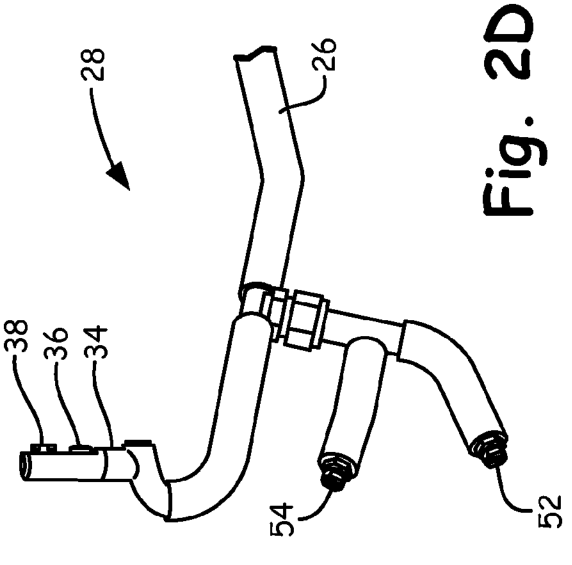
FIG. 2D shows a close up portion of the manifold of FIG. 2D.

FIG. 2A shows a second embodiment of a rear mounted engine wash manifold 40 connected to engine 12 with parts of the engine cut-away for viewing purposes. FIG. 2B shows a close up view of a portion of manifold 40 and engine 12 showing airflow F and wash fluid droplet flow path D. FIG. 2C shows a perspective view of the manifold 40, and FIG. 2D shows a close up view of first end 28 of manifold 40.

Similar parts are labeled with the same numbers as those in FIGS. 1A-1C. Portion of engine 12 shown includes case 13, bypass duct 14 with fan exit guide vanes 16, core inlet splitter 18, stators 20 and engine core 22 with core inlet 23, fan 42 with hub 46 and blades 44 (each blade 44 with forward side 48 and aft side 50). Manifold 40 includes retention system 24, wash delivery segment 26 with first end 28, second end 30 with inlet 31, connection 32 (with rings 33), core nozzles 34, 36, 38, fan nozzles 52, 54 and alignment bar 39. Also shown are arrows indicating engine airflow F and wash fluid droplet flowpath D.

Manifold 40 connects to case 13 which surrounds bypass duct 14 and to core inlet splitter 18 in the same way as described above in relation to FIGS. 1A-1C. Manifold 40 additionally has fan nozzles 52 and 54, which direct wash fluid at aft side 50 of fan blades 44 and alignment bar 39 which interfaces with fan exit guide vanes 16. While manifold 40 shows two fan nozzles 52, 54, a different number of fan nozzles may be used in other embodiments. One or more fan nozzles 52, 54 can be oriented to wash fan blade 44 from root to tip and can be angled to ensure all parts of the complex blade 44 surface geometry is contacted by wash fluid.

Alignment bar 39 can be connected to wash delivery segment 26 with thumb screws so that it is adjustable relative to wash delivery segment 26. Alignment bar 39 interfaces with fan exit guide vanes 16 to restrict forward extension of wash delivery segment 26, preventing wash delivery segment 26 from hitting (and possibly damaging) fan blades during installation. Alignment bar 39 additionally helps to secures wash delivery segment 26 relative to engine 12 for washing operations.

In some systems, engine can be cranked during washing creating airflow F shown in FIG. 2B. Wash fluid can be sprayed at such a flow rate and droplet size that it flows just beyond forward side 48 of fan blades and then is pulled back into engine by airflow caused by fan 42 rotation, causing the wash fluid to impact forward side 48 of blades 44 and then proceed to flow through engine core 22. The spray forward and/or droplet size of wash fluid through nozzles 52, 54 can be set to make wash fluid able to overcome fan air velocity to reach a leading edge of fan 42. The water droplets sprayed from nozzles 52, 54 may or may not extend beyond engine inlet 12, as shown in the example flow paths D of FIG. 2B.

Appropriate droplet size, pressure and other parameters used for dispensing wash fluid through nozzles 34, 36, 38, 52, 54 can vary depending on engine type, engine and/or environmental conditions and other factors. For example, nozzles 34, 34, 38 may most effectively clean core 22 with an atomized, high pressure, small droplet spray. For example, nozzles 34, 36, 38 could spray with a pressure of 13-275 bar (200-4000 psi), a droplet size of 50-250 μm, and a volumetric flow rate of 0.5-60 L/min. (1-16 GPM) through each nozzle. In other embodiments, nozzles 34, 36, 38 could have a pressure of 50-80 bar (735-1175 psi) and a droplet size of 120-250 μm. Nozzles 52, 54 may provide an atomized, high pressure spray and/or a low pressure non-atomized spray. For example, nozzles 52, 54 may provide wash fluid at a pressure of 4-275 bar (60-4000 psi), droplet size of 50-2000 μm and/or a volumetric flow rate of 0.5-60 L/min (0.1-16 GPM) through each nozzle 52, 54.

By entering through bypass duct 14 and interfacing with core inlet splitter 18, manifold 40 allows for rear washing of fan 42, including direct washing of aft side 50. Past systems for washing aft side 50 of fan 42 included manually wiping down aft side 50 of fan blades 44 with a cloth. This is a time consuming process, as the blades 44 must be manually wiped down one by one. Manifold 40 allows for effective and efficient simultaneous washing of both engine core 22 (with nozzles 34, 36, 38) and aft side 50 of fan blades 44 (with nozzles 52, 54). Alignment bar 39 prevents damage from wash delivery segment going too far forward and hitting and possibly damaging fan 42 blades 44 during installation.

Figure 3:
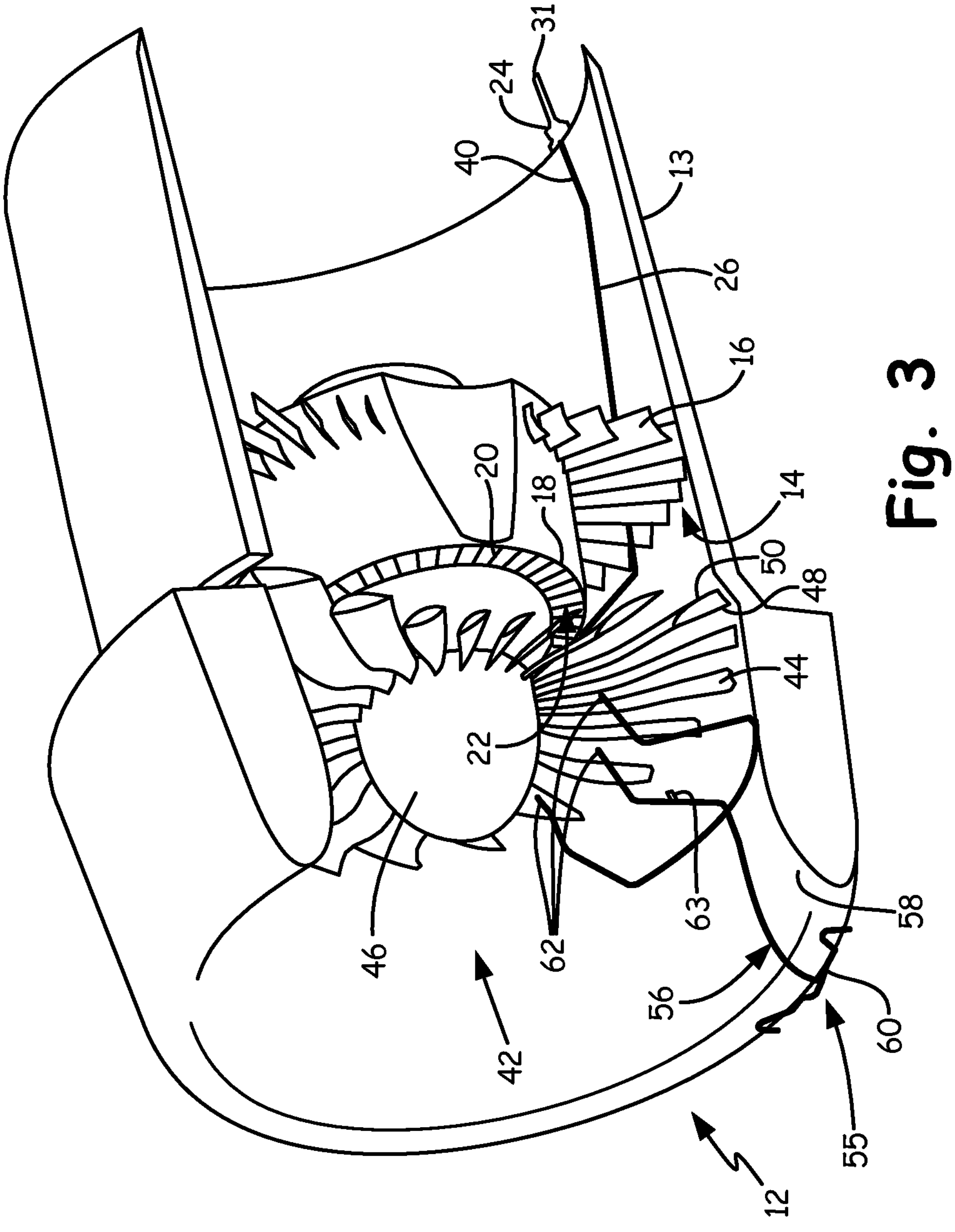
FIG. 3 shows the rear mounted engine wash manifold of FIG. 2A used in combination with a front mounted manifold.

FIG. 3 shows the washing system 55, including rear mounted engine wash manifold 40 used in combination with a front mounted manifold 56. Engine 12 includes case 13, bypass duct 14 with fan exit guide vanes 16, core inlet splitter 18, stators 20, core inlet 23, fan 42 with hub 46 and blades 44 (each blade 44 with forward side 48 and aft side 50) and nacelle 58. Manifold 40 includes retention system 24, wash delivery segment 26 with first end 28, second end 30 with inlet 31, core nozzles 34, 36, 38 (not visible) and fan nozzles 52, 54 (not visible). Manifold 56 includes retention structure 60 and nozzles 62, 63.

Manifold 56 connects to nacelle 58 through retention structure 60 to position nozzles 62, 63 to spray into engine 12 and at forward side 48 of fan blades 44. Manifold 56 can be connected to the same source of washing fluid as manifold 40, or can be connected to different sources. Manifold 56 is shown for example purposes only, and other inlet manifolds which spray into engine could be used in washing system 55.

By using both rear mounted manifold 40 and front mounted manifold 56, washing system 55 provides an efficient and effective wash to forward side 48 and aft side 50 of fan blades 44 and to engine core 22. Manifold 40 is positioned so that nozzles 52, 54 wash aft side 50 of blades 44 and nozzles 34, 36, 38 direct wash fluid straight into core 22. Manifold 56 uses nozzle 63 to spray forward side 48 of blade 44. Wash manifold 56 uses nozzles 62 to direct wash fluid through fan blades 44 and into core 22, though nozzles 62 can in some embodiments spray fan blades 44 as well. Wash fluid from manifold 56 is then pulled into engine with airflow (due to engine cranking) to wash engine 12 core 22 and fan 42.

Figure 4A:
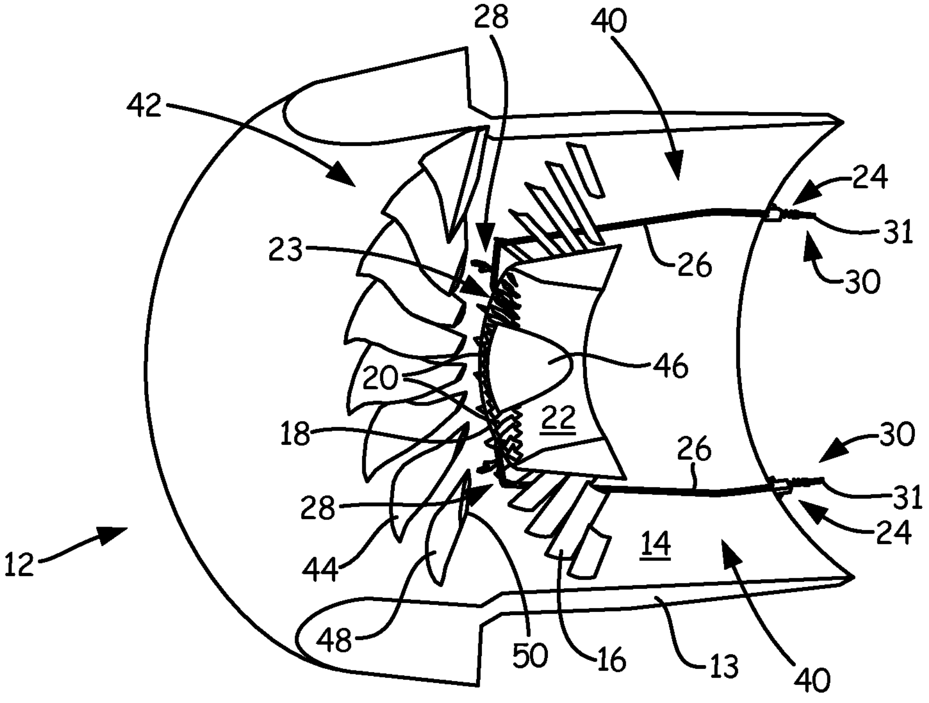
FIG. 4A shows a cross-sectional top view of an engine with a wash system including two rear mounted engine wash manifolds.
Figure 4B:
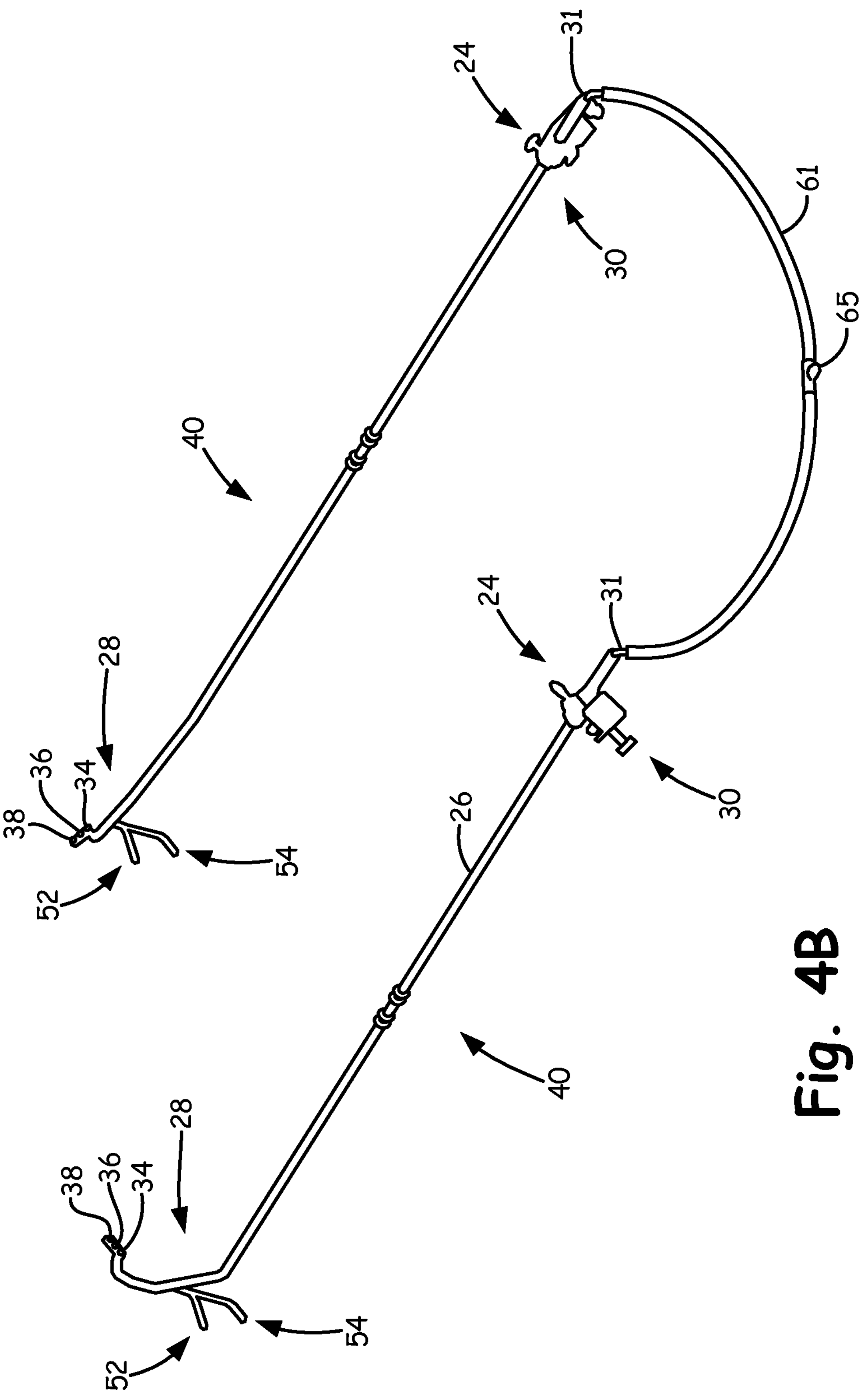
FIG. 4B shows a perspective view of the two wash manifolds of FIG. 4A connected by a hose.
Figure 4C:
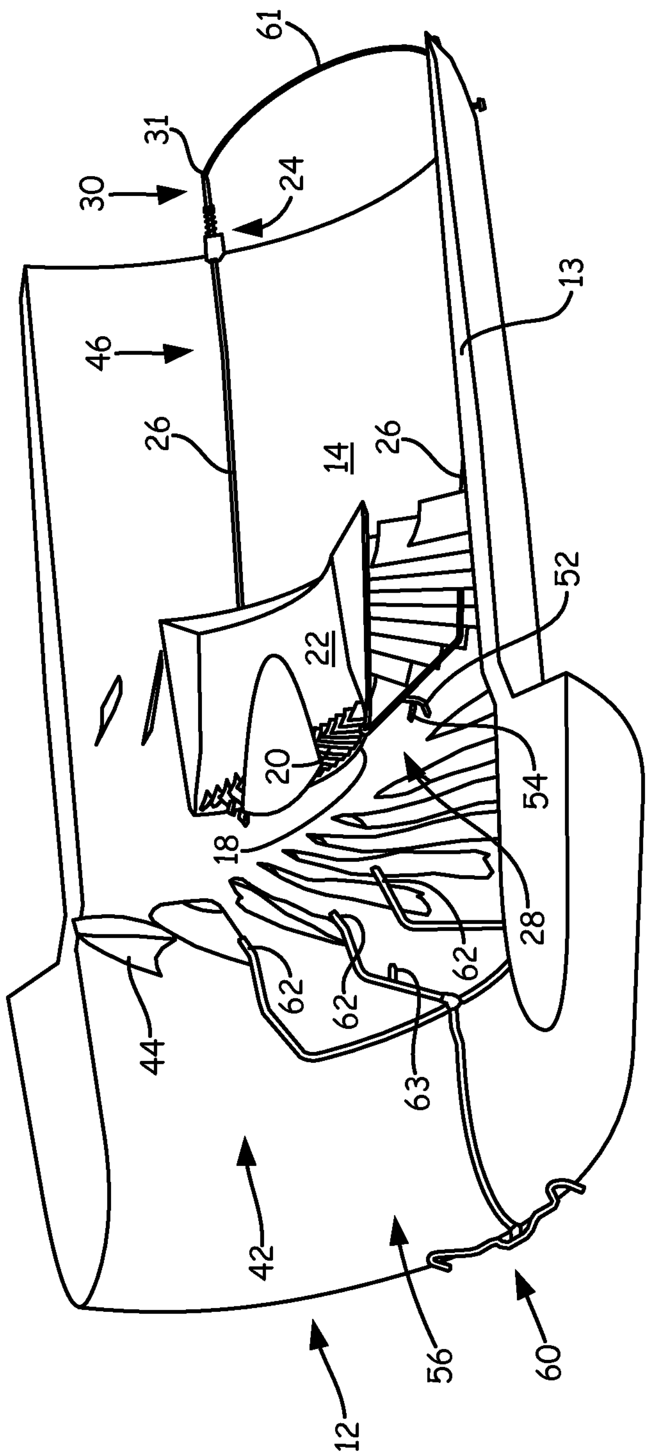
FIG. 4C shows the two rear mounted engine wash manifolds of FIG. 4A mounted to an engine in combination with a front mounted manifold, with part of the engine cut-away for viewing purposes.

FIG. 4A shows a cross-sectional top view of engine 12 with a wash system including two rear mounted engine wash manifolds 40, FIG. 4B shows a perspective view of wash manifolds 40 connected by hose 61, and FIG. 4C shows rear mounted engine wash manifolds 40 mounted to engine 12 in combination with front mounted manifold 56, with part of the engine cut-away for viewing purposes.

FIGS. 4A-4C include engine 12 (with case 13, bypass duct 14 with fan exit guide vanes 16, core inlet splitter 18, stators 20 and engine core 22 with core inlet 23, fan 42 with hub 46 and blades 44 with forward side 48 and aft side 50), rear mounted manifolds 40 (with retention system 24, wash delivery segment 26 with first end 28, second end 30 with inlet 31, core nozzles 34, 36, 38 and fan nozzles 52, 54), hose 61 with inlet 65 and front mounted manifold 56 (with retention structure 60 and nozzles 62, 63). Inlet 65 can include a T-fitting to receive wash liquid and send it to each of manifolds 40.

Manifolds 40 connect to engine 12 and work to wash engine 12 the same as described in relation to FIGS. 2A-2D, and manifold 56 connects to engine 12 and works to wash engine 12 the same as described in relation to FIG. 3. In the embodiment shown in FIGS. 4A-4C, a plurality of rear mounted manifolds 40 work together to simultaneously deliver wash fluid to engine 12 core 22 and fan blades 42. Hose 61 connects rear mounted manifolds 40 together so that inlet 65 receives the wash fluid for delivery to engine 12 core 22 and fan 42.

Using a plurality of rear mounted manifolds 40 separately or in combination with a front mounted manifold 56 (as shown in FIG. 4C) can provide an efficient and thorough engine 12 cleaning. Using a plurality of rear mounted manifolds 40 can delivery more wash fluid to and around to different parts of engine core 22 and blades 44, which can be especially useful in large engines 12.

Figure 5B:
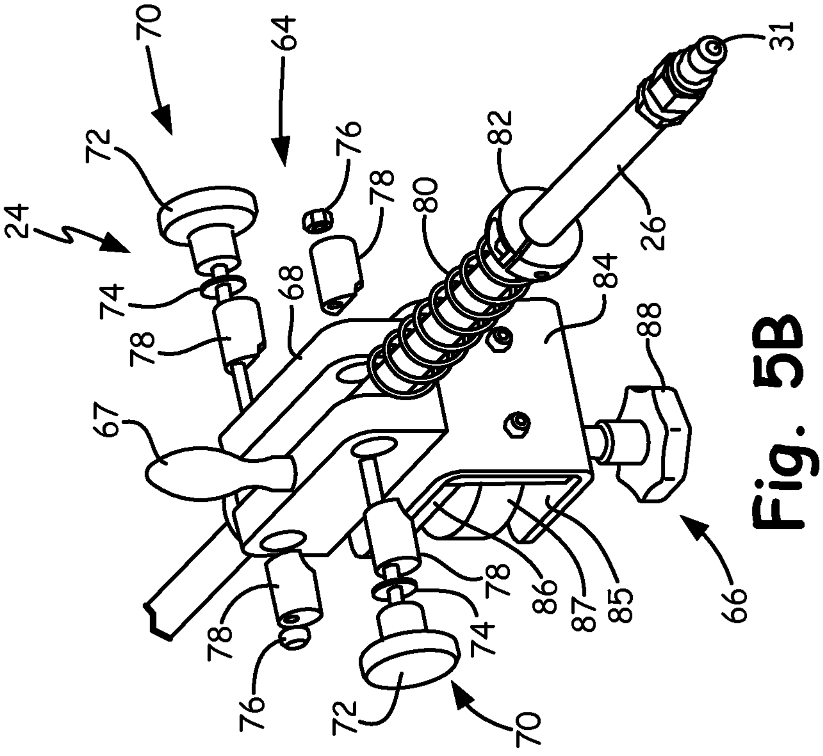
FIG. 5B shows an exploded view of the retention system of FIG. 4A.
Figure 5A:
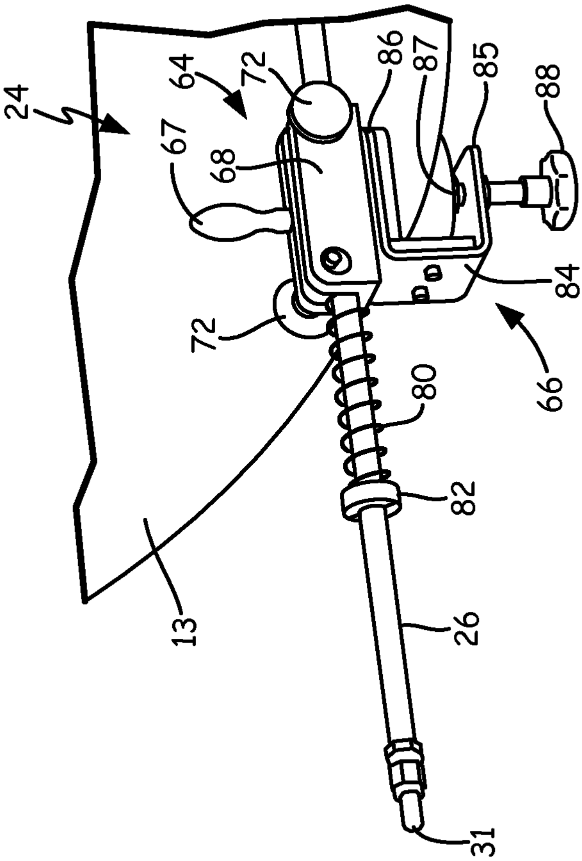
FIG. 5A shows a perspective view of a retention system for a rear mounted wash manifold.

FIG. 5A shows a perspective view of retention system 24 connected to case 13 surrounding bypass duct 14, and FIG. 4B shows an exploded view of the retention system 24. Retention system 24 includes manifold clamp 64, case clamp 66 and handle 67. Manifold clamp 64 includes trough 68, tube clamps 70 (each with knob screw 72, washer 74, nut 76 and split cylinder 78), spring 80 and collar 82. Case clamp 66 includes bracket 84 (with first arm 85 and second arm 86), foot pad 87 and knob screw 88. Also shown is second end 30 of wash delivery segment 26 and inlet 31.

Collar 82 fits securely around wash delivery segment at second end 30. Trough 68 receives wash delivery segment 26 and spring 80 pushes wash delivery segment 26, and thus, whole manifold (10, 40) toward rear of engine 12 securing first end 28 against core inlet splitter 18 (see FIGS. 1A, 2A, 2B). Wash delivery segment 26 can slide forward and aft through trough 68. Tube clamps 70 can then secure wash delivery segment 26 in place by knob screw 72 connecting to nut 76 to tighten split cylinder segments 78 around wash delivery segment 26. Split cylinder segments 78 are cylindrical, and can have ends which are angled or shaped to interface with the outer radius of wash delivery segment 26, to ensure wash delivery segment pipe 26 is held tightly, locking into place in trough 68. Tube claim 70 are also biased from opposing sides to ensure a secure connection. Manifold clamp 64 can be connected to case clamp 66 by bolting, welding or any other means. Handle 67 connects to manifold clamp 64, allowing one to easily place retention system 24 at desired location.

Case clamp 66 connects to and clamps around case 13, securing retention system 24 to case. Foot pad 87 can be rubber or another material to prevent scratching and should be a sufficient size to spread out force and ensure secure clamping. For example, foot pad 87 can have a diameter of 76.2 mm (3 inches). As shown in the embodiment of FIGS. 5A-5B, bracket 84 can be lined with plastic or another material to prevent scratching of case 13. Foot pad 87 is connected to the end of knob screw 88 and moves with knob screw 88. Knob screw 88 moves through bracket 84 first arm 85 to clamp case 13 between second arm 86 and foot pad 87, thereby securing retention system 24 to case 13. Manifold clamp 64 retains manifold 10, 40 by biasing wash delivery segment 26 with spring 80 and clamp 82 and further securing with tube clamp 70 with split cylinders 78.

Retention system 24 acts to secure rear mounted wash manifold 40 to case 13, with multi-locking retention features for stabilizing rear mounted manifold 40 during a washing operation while preventing damage from connection. Case clamp 66 secures retention system 24 to case without scratching or damaging case. Manifold clamp 64 secures wash delivery segment 26 and holds manifold 40 in place by biasing wash delivery segment with spring 80 and collar 82, allowing manifold to secure or hook onto core inlet splitter 18 on first end 28. Tube clamp 70 of manifold clamp 64 further secures wash delivery segment 26 using split cylinders 78 with surfaces that conform to wash delivery segment 26. Handle 67 ensures retention system 24 is easy to move and place where desired.

In summary, rear mounted manifold 10, 40, allows for effective and efficient engine 12 washing by spraying wash fluid directly into core 22 engine 12 and/or at fan 42. Wash delivery segment 26 can enter through bypass duct 14 and secure against core inlet splitter 18 and case 13 with retention system 24. Retention system 24, through the use of biasing spring 80, tube clamps 70 and case clamp 66 is able to hold manifold 10, 40 in place during washing operations. Wash delivery segment 26 can then deliver wash fluid through nozzles directly into core 22, improving penetration and washing of core engine components. Wash delivery segment 26 can also deliver wash fluid toward aft side 50 of fan blades 44, spraying from behind and through fan 42. This rear washing of fan 42 blades 44 can efficiently remove contaminants from surfaces that were in past systems only occasionally manually cleaned, thereby resulting in an overall cleaner engine. This simultaneous washing of engine 12 core 22 and fan 42 provides a superior washing process which can increase engine performance by decreasing engine temperatures, reducing fuel consumption, restoring engine power and improving overall engine efficiency.

While retention system 24 is shown as used with rear mounted manifold 10, 40, it can be used with other systems that need secured. While manifolds 10, 40 are shown to connect to bypass duct 14, in other engines manifolds 10, 40 could connect to engine exhaust, a mixed bypass/exhaust duct or another structure rear of fan 42.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An engine wash manifold for delivering wash fluid to an engine with an inlet, a fan, a case with a bypass duct and a core inlet splitter, the engine wash manifold comprising:
- a wash delivery segment comprising a pipe shaped to follow at least in part an engine case curvature with a first end to interface with the core inlet splitter and a second end with an inlet to receive the wash fluid, wherein the pipe includes a turn portion configured so as to be able to redirect at least a portion of the wash fluid to a core inlet;
- a retention system to secure the wash delivery segment to the engine, the retention system capable of being mounted to a rear of the engine; and
- one or more nozzles on the first end of the wash delivery segment to spray wash fluid.

2. The engine wash manifold of claim 1, wherein the one or more nozzles are shaped and positioned to spray into the core inlet.

3. The engine wash manifold of claim 1, wherein the wash delivery segment further comprises one or more additional nozzles directed at the fan.

4. The engine wash manifold of claim 3, wherein the one or more additional nozzles are oriented to spray aft sides of fan blades.

5. The engine wash manifold of claim 4, wherein the one or more additional nozzles each spray the aft sides of the fan blades in an outward direction.

6. The engine wash manifold of claim 3, wherein the nozzles provide an atomized spray.

7. The engine wash manifold of claim 3, wherein the nozzles are configured to spray the wash fluid to overcome fan air velocity to reach a leading edge of fan blades.

8. The engine wash manifold of claim 3, wherein the nozzles are configured to spray the wash fluid to overcome fan air velocity to go beyond a leading edge of fan blades.

9. The engine wash manifold of claim 3, and further comprising:

a second manifold connected to the engine inlet to spray the wash fluid at the engine core and/or fan.

10. The engine wash manifold of claim 1, wherein the wash delivery segment comprises a plurality of wash delivery segments connected together.

11. The engine wash manifold of claim 10, and further comprising rings placed where the wash delivery segments are connected together.

12. The engine wash manifold of claim 1, wherein the one or more nozzles atomize the wash fluid.

13. The engine wash manifold of claim 1, wherein the first end to interface with the core inlet splitter is shaped to secure the first end portion to the core inlet splitter.

14. The engine wash manifold of claim 1, and further comprising an integrated nozzle head to house and position the one or more nozzles.

15. The engine wash manifold of claim 1, wherein the retention system clamps the manifold to at least one of the bypass duct, an exhaust duct, and a mixed bypass/exhaust duct.

16. The engine wash manifold of claim 1, wherein the manifold is covered with a protective rubber covering.

17. The engine wash manifold of claim 1, and further comprising:

one or more additional nozzles positioned to spray between core stators and penetrate the core inlet.

18. The engine wash manifold of claim 1, and further comprising:

a second manifold connected to the engine inlet to spray the wash fluid at the engine core and/or fan.

19. The engine wash manifold of claim 1 and further comprising a second engine wash manifold for delivering the wash fluid to the engine, the second engine wash manifold comprising:

a second wash delivery segment comprising a second pipe shaped to follow at least in part the engine case curvature with an end to interface with the core inlet splitter and an opposite end with an inlet to receive the wash fluid;

a second retention system to secure the second wash delivery segment to the engine; and one or more nozzles on the first end of the second wash delivery segment to spray the wash fluid.

20. The engine wash manifold of claim 19, wherein the first engine wash manifold and the second engine wash manifold are connected by a hose delivering the wash fluid to the first engine wash manifold and to the second engine wash manifold.

21. The engine wash manifold of claim 1, wherein the turn portion of the pipe comprises a hook shaped region.

22. The engine wash manifold of claim 1, and further comprising:

an adjustable alignment bar connected to the wash delivery segment.

23. An engine wash manifold for delivering wash fluid to an engine with an inlet, a fan, a case with a bypass duct and a core inlet splitter, the engine wash manifold comprising:

a wash delivery segment comprising a pipe shaped to follow at least in part an engine case curvature with a first end to interface with the core inlet splitter and a second end with an inlet to receive the wash fluid, wherein the pipe includes a turn portion configured so as to be able to redirect at least a portion of the wash fluid to a core inlet;

a retention system to secure the wash delivery segment to the engine, the retention system capable of being mounted to a rear of the engine, wherein the retention system comprises:

a first clamp to connect the retention system to the engine; and a tube clamp connected to the first clamp, the tube clamp with a trough to receive the pipe, a plurality of ring clamps with clamping elements extending into the trough, a collar to clamp around the pipe and a spring to bias the trough from the collar; and one or more nozzles on the first end of the wash delivery segment to spray the wash fluid.

24. A method for washing an engine with an inlet, a fan, a core, a case with a core inlet splitter and a bypass duct, the method comprising: securing a first rear mounted manifold in the engine aft of the fan, the first rear mounted manifold comprising a wash delivery segment comprising a pipe shaped to follow at least in part an engine case curvature with a first end to interface with the core inlet splitter and a second end with an inlet to receive a wash fluid, wherein the pipe includes a turn portion configured so as to be able to redirect at least a portion of the wash fluid to a core inlet; a retention system to secure the wash delivery segment to an engine, the retention system capable of being mounted to a rear of the engine; and one or more nozzles on the first end of the wash delivery segment to spray the wash fluid; and spraying the wash fluid from the first rear manifold.

25. The method of claim 24, wherein the step of spraying wash fluid from the first manifold comprises:

spraying the wash fluid from the first manifold into the core.

26. The method of claim 24, wherein the step of spraying wash fluid from the first manifold comprises:

spraying the wash fluid from the first manifold at the fan.

27. The method of claim 26, wherein the spraying the wash fluid from the first manifold at the fan comprises spraying aft sides of fan blades.

28. The method of claim 24, wherein the wash fluid is atomized wash liquid.

29. The method of claim 24, and further comprising:

securing one or more additional rear mounted manifolds in the engine aft of the fan; and spraying and the wash fluid from the one or more additional rear mounted manifolds.

* * * * *